United States Patent
Park et al.

(10) Patent No.: US 8,559,750 B2
(45) Date of Patent: Oct. 15, 2013

(54) METHOD OF PERFORMING ADAPTIVE CONTRAST ENHANCEMENT USING HYPERBOLIC TANGENT CURVE AND IMAGE HISTOGRAM

(75) Inventors: Soo Jin Park, Seoul (KR); Deepak Chandra Bijalwan, Karnataka (IN); Naveen Koul, Karnataka (IN)

(73) Assignee: LG Innotek Co., Ltd., Seoul (KR)

( * ) Notice: Subject to any disclaimer, the term of this patent is extended or adjusted under 35 U.S.C. 154(b) by 245 days.

(21) Appl. No.: 13/114,557

(22) Filed: May 24, 2011

(65) Prior Publication Data

US 2012/0114238 A1 May 10, 2012

(30) Foreign Application Priority Data

Nov. 8, 2010 (KR) .......................... 10-2010-0110235

(51) Int. Cl.
*G06K 9/40* (2006.01)
(52) U.S. Cl.
USPC ........... 382/274; 382/117; 382/118; 382/168; 382/169; 382/170; 382/171; 382/172
(58) Field of Classification Search
USPC .......... 382/177–188, 168–172, 117, 118, 274
See application file for complete search history.

(56) References Cited

U.S. PATENT DOCUMENTS

| 4,641,267 | A * | 2/1987 | Asai et al. ..................... 250/582 |
| 5,768,440 | A * | 6/1998 | Campanelli et al. .......... 382/261 |
| 6,771,814 | B1 * | 8/2004 | Nakajima ..................... 382/168 |
| 6,826,310 | B2 * | 11/2004 | Trifonov et al. .............. 382/274 |
| 7,319,787 | B2 * | 1/2008 | Trifonov et al. .............. 382/168 |
| 7,953,286 | B2 * | 5/2011 | Chiang et al. ................. 382/254 |
| 8,035,871 | B2 * | 10/2011 | Kameyama ................... 358/520 |
| 2003/0053690 | A1 * | 3/2003 | Trifonov et al. .............. 382/168 |
| 2005/0100242 | A1 * | 5/2005 | Trifonov et al. .............. 382/274 |
| 2007/0041636 | A1 * | 2/2007 | Yoon et al. .................... 382/169 |

OTHER PUBLICATIONS

Nonlinear Image—Enviornment, Tao et al., SPIE, 0277-786X,2006, pp. 1-12.*

* cited by examiner

*Primary Examiner* — Jayesh A Patel
(74) *Attorney, Agent, or Firm* — Saliwanchik, Lloyd & Eisenschenk

(57) ABSTRACT

Disclosed is a method of performing contrast enhancement for an image. A mean luminance value is calculated with respect to an image that is read, the type of the image is determined based on the mean luminance value, a contrast reference curve is created by using a hyperbolic tangential function curve according to the type of the image, and the contrast of the image is enhanced by using the contrast reference curve.

4 Claims, 9 Drawing Sheets reference profile of contrast curve of low lighting image reference profile of contrast curve of back lighting image reference profile of contrast curve of regular lighting image reference profile of high contrast curve

METHOD OF PERFORMING ADAPTIVE CONTRAST ENHANCEMENT USING HYPERBOLIC TANGENT CURVE AND IMAGE HISTOGRAM

CROSS-REFERENCE TO RELATED APPLICATION

This application claims the benefit under 35 U.S.C. §119 of Korean Patent Application No. 10-2010-0110235, filed Nov. 8, 2010, which is hereby incorporated by reference in its entirety.

BACKGROUND OF THE INVENTION

1. Field of the Invention

The present invention relates to a method of performing contrast enhancement for an image photographed by a digital camera or read out from a storage medium by using a hyperbolic tangential function curve. More particularly, according to the present invention, the mean luminance value is calculated with respect to an image that is read, the type of the image is determined based on the mean luminance value, a contrast reference curve is created by applying a hyperbolic tangential function curve according to the type of the image, and the contrast of the image is enhanced by using the contrast reference curve.

2. Description of the Related Art

Contrast refers to a visual property to distinguish between an object and a background in an image. Since the eyes of a person are different from an optical sensor of a digital camera, if the person views an image which is photographed by a digital camera and not subject to image processing, the person may recognize the image as a blurred image. In this regard, if the contrast of the image is changed suitably for the eyes of the person through the image processing, a superior image suitable for the eyes of the person can be created.

Recently, there are many algorithms to solve the problems related to the contrast of images photographed under different lighting conditions such as bright, dark, and back lighting conditions. However, most of the algorithms have a problem in accuracy, or are very complex, so that the algorithms cannot be easily applied to a portable digital camera or a cellar phone equipped with a camera.

BRIEF SUMMARY

An object of the present invention is to provide a method of performing adaptive contrast enhancement optimized to images photographed under all lighting conditions, particularly, dark or bright lighting conditions.

According to one embodiment of the present invention, there is provided a method of performing adaptive contrast enhancement according image types. The method includes reading an image, calculating a mean luminance value and luminance histogram of the image, determining a type of the image based on the mean luminous value and the luminous histogram, creating contrast reference curves by applying different coefficients according image types to a hyperbolic tangential function curve, and performing contrast enhancement of the image by using the contrast reference curve.

According to the present invention, the padding phenomenon of an image photographed by a digital camera can be prevented.

According to the present invention, the blurred phenomenon of the photographed image or a phenomenon, in which the boundary between bright and dark portions of the image is excessively sharpened, can he prevented It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments of the present invention will be described in more detail with reference to accompanying drawings.

Figure 1:
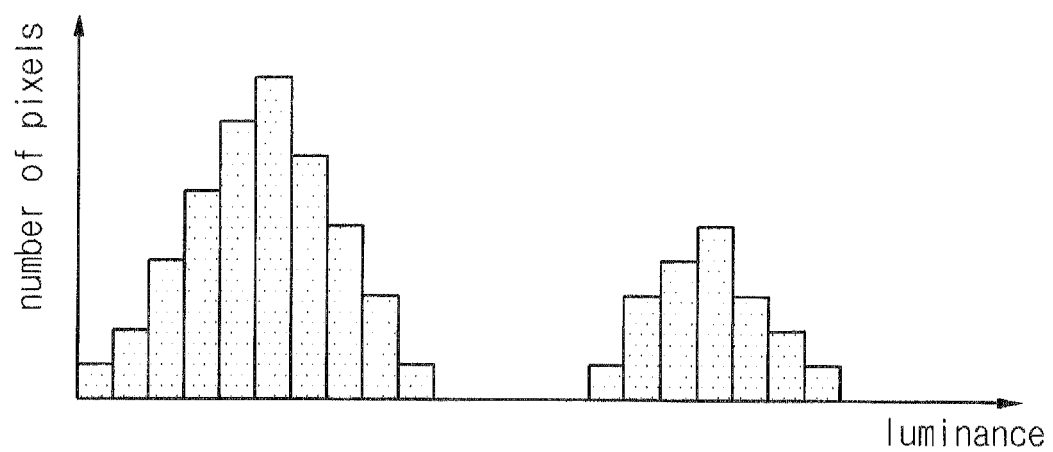
FIG. 1 is a graph showing one example of the histogram distribution of an image.

FIG. 1 is a graph showing an example of the histogram distribution of an image. In FIG. 1, an X axis represents luminance values of 0 to 255, and a Y axis represents the number of pixels corresponding to each luminance value. An image photographed by a camera may have the histogram distribution shown in FIG. 1 or the histogram distribution in a predetermined form. If histogram distribution is concentrated near a specific luminance value, the boundary regions of the image are represented as blurred, so that a person may recognize the image as an excessive bright image or an excessive dark image. In order to allow such an image to be clearly recognized by the eyes of a person, a contrast enhancement process is performed with respect to the image so that pixels of the image can be distributed throughout the whole range of luminance values.

According to the present invention, a reference curve for contrast enhancement is created by using a hyperbolic tangential curve representing properties similar to those of contrast sensitivity of the eyes of a person, and the contrast of the image is enhanced based on the reference curve.

Figure 2:
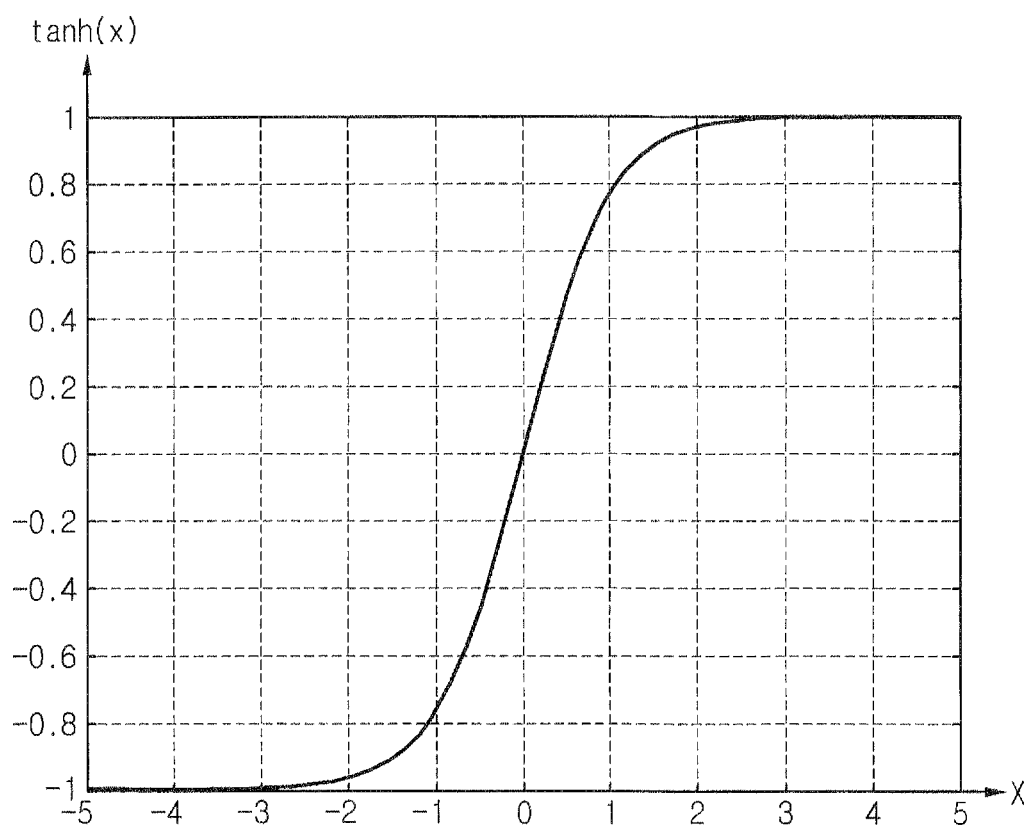
FIG. 2 is a graph showing one example of a hyperbolic tangential function (tanh(x))

FIG. 2 is a graph showing one example of the hyperbolic tangential function (tanh(x)). In FIG. 2, an X axis has the range of −5 to +5, and the maximum value of a Y axis is +1, and the minimum value of the Y axis is −1.

Figure 3:
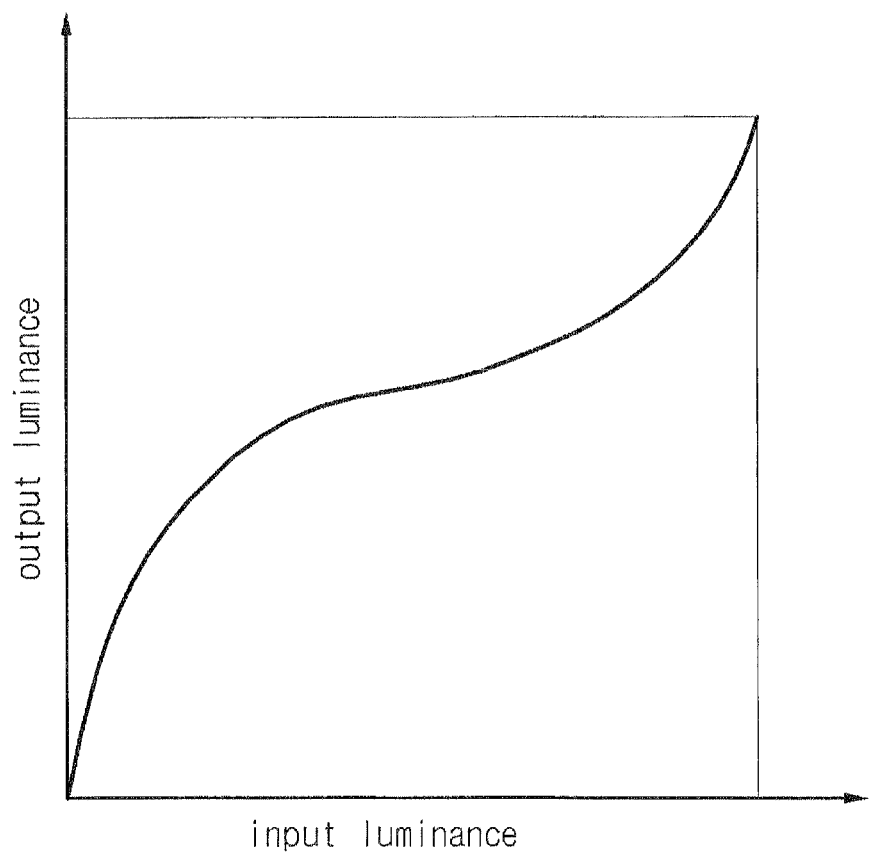
FIG. 3 is a graph representing the contrast sensitivity by eyes of a person.

FIG. 3 is a graph showing contrast sensitivity of the eyes of the person. In FIG. 3, an X axis represents measured luminance values of an image photographed by an image sensor of a camera, and a Y axis represents luminance values recognized by the eyes of the person. As shown in FIG. 3, the eyes of a person recognize little luminance variation as great luminance variation, are insensitive to the luminance variation in a middle luminance region, and recognize a little luminance variation as great luminance variation in a high luminance region.

Referring to FIGS. 2 and 3, the patterns of graphs are nearly similar to each other. Accordingly, if the curve having the form of a hyperbolic tangential function is used as a reference curve for the luminance histogram of an image photographed by a camera, so that the contrast of the image is enhanced, the contrast of the image suitable for the eyes of the person can be obtained.

Therefore, according to the present invention, reference curves for the contrast enhancement of photographed images are created, and the contrast enhancement of the images is performed by using the reference curves. The reference curves may vary according to the properties of images, so that adaptively optimized contrast enhancement can be performed with respect to the images.

According to one embodiment of the present invention, photographed images are classified into four types of images according to lighting intensities as described below.
1. Low lighting image
2. Back lighting image
3. regular lighting image
4. High contrast image In order to determine the type of the photographed image, the mean luminance value (Imean) and the luminance histogram distribution of the photographed image can be used as described below.
1. In the case of 0<Imean≤50: low lighting image.
2. In the case of 50<Imean≤200: regular lighting image.
3. In the case of 200<Imean≤255: hack lighting image.
4. In the case in the maximum number of pixel counts is represented at both high and low luminance values in luminance histogram distribution: High contrast image.

In order to create a hyperbolic tangential curve function, which serves as a reference curve, after determining the type of the photographed image, different coefficients, that is, different cutoff factors (Cutoff_Factor) and different amplitude factors (Amplitude_Factor) are used according to the types of images. Following coefficients are the optimum coefficients which are obtained through an experiment.
1. Low lighting image
Cutoff_Factor=0.35, and Amplitude_Factor=0.74.
2. Back lighting image
Cutoff_Factor=0.35, and Amplitude_Factor=6.
3. Regular lighting image
Cutoff_Factor=1, and Amplitude_Factor=1.94.
4. High contrast image
Cutoff_Factor=1, and Amplitude_Factor=0.0002.

The reference curves according to the types of images are calculated as follows.
1. Calculate "Normalized pixel value (NormPixVal)=Pixel value (PixVal)/255". In this case, the pixel value is in the range of 0 to 255.
2. Calculate x=(NormPixVal^Cutoff_Factor−0.5)* Amplitude_Factor. In this case, the Cutoff_Factor and the Amplitude_Factor are coefficients given according the types of the images.
3. Calculate tanh(x)
4. Calculate the maximum value and the minimum value of tanh(x).
5. Normalize the values of tanh(x) into the range of 0 to 255.

Figure 4:
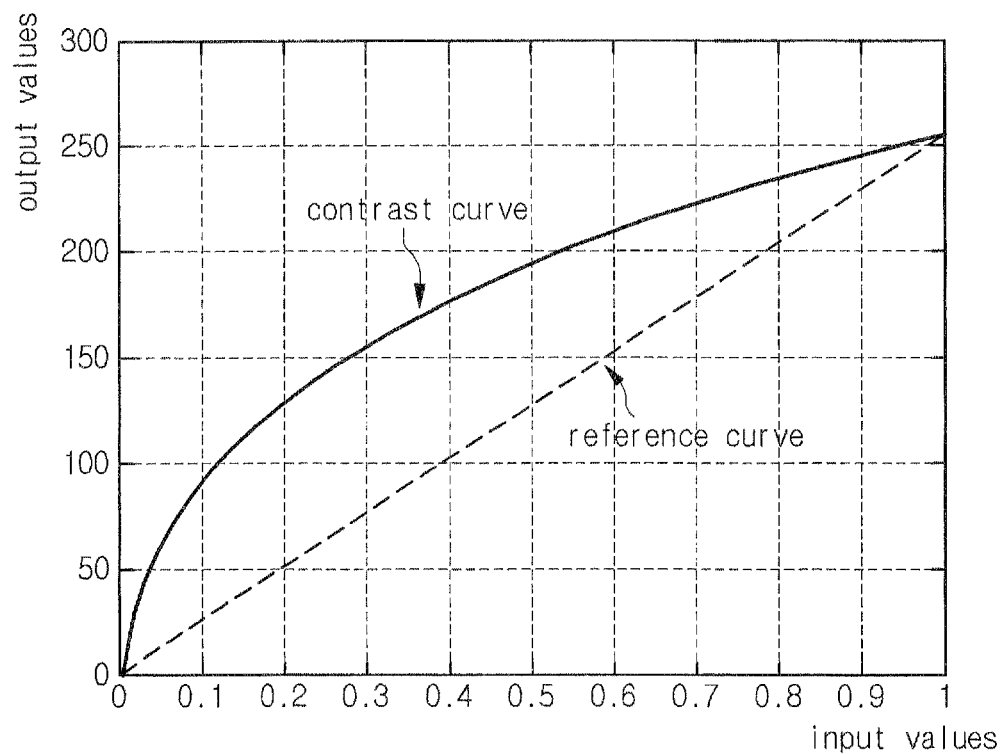
FIGS. 4 to 7 are graphs showing reference curves according the types of an image.
Figure 5:
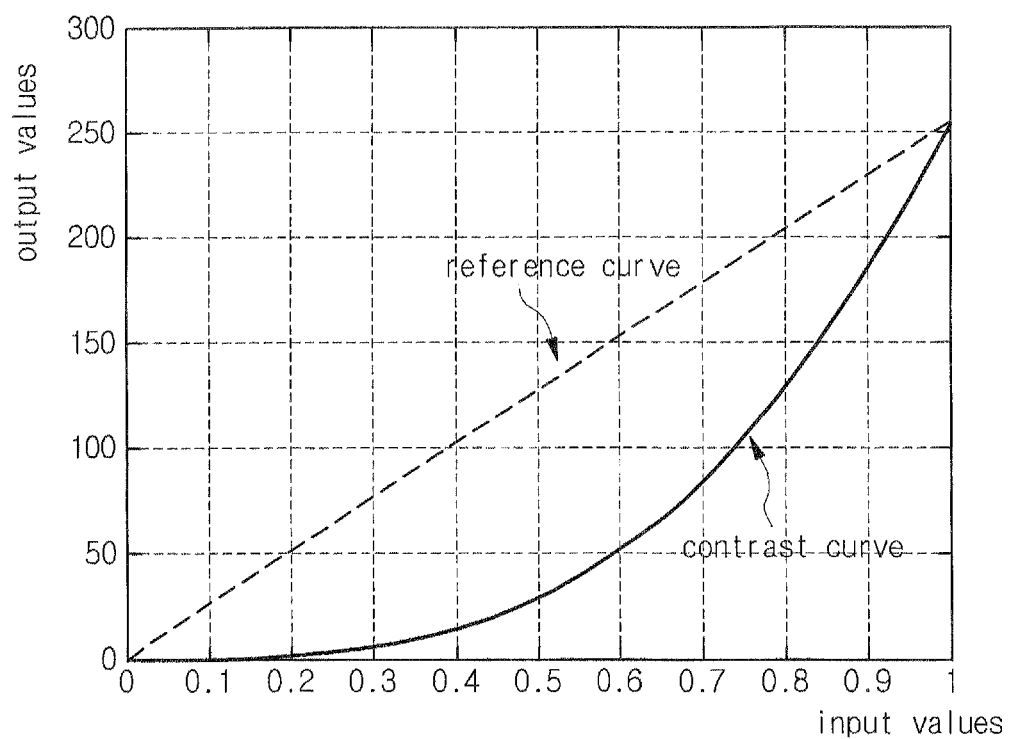
Figure 6:
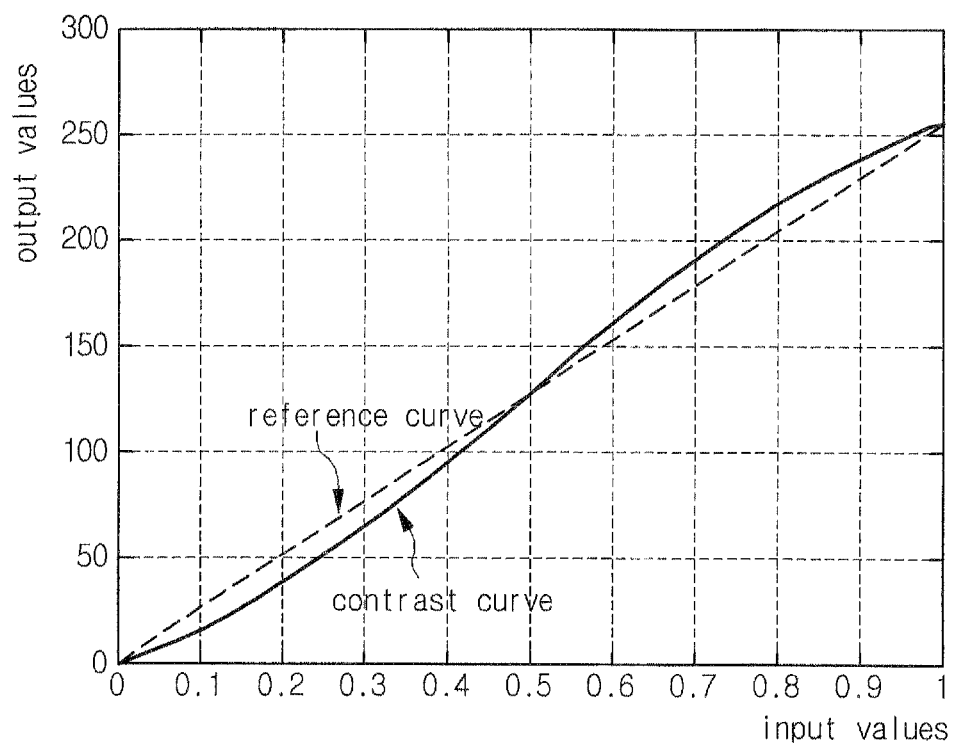
Figure 7:
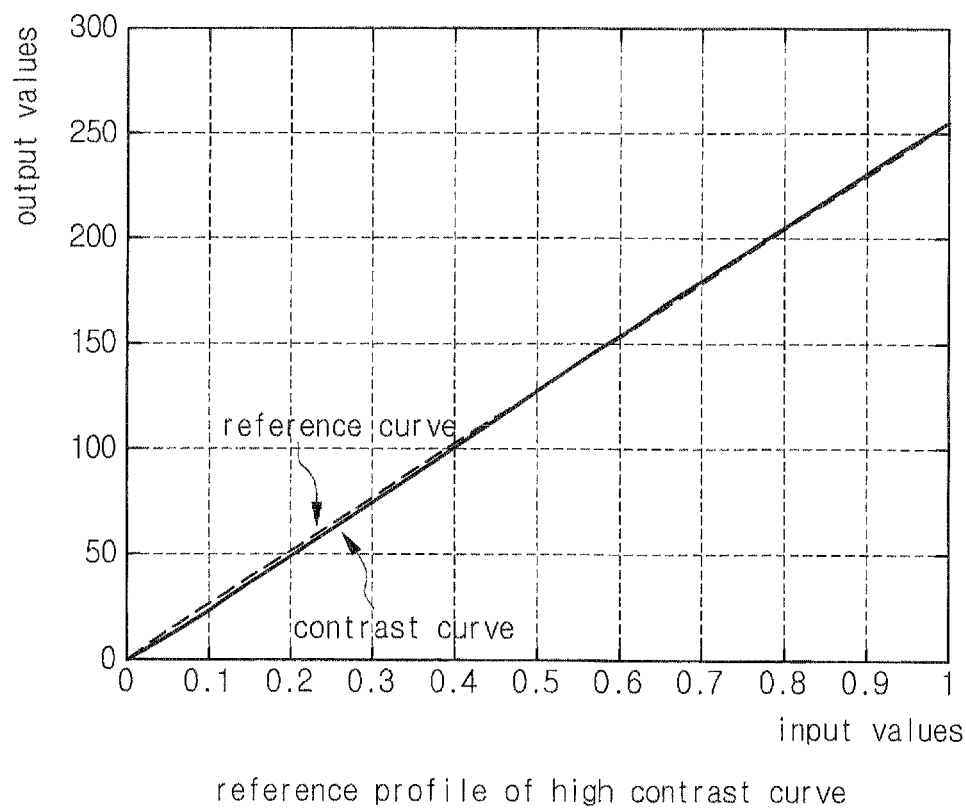

The contrast of the photographed image can be enhanced by using the contrast reference curve created through the above processes. FIGS. 4 to 7 are graphs showing reference curves calculated according the types of images. In each drawing, a dashed line represents linear distribution which does not require contrast enhancement. In detail, FIG. 4 is a graph showing a reference curve for a low lighting image, and FIG. 5 is a graph showing a reference curve for a back lighting image. FIG. 6 is a graph showing a reference curve for a regular lighting image, and FIG. 7 is a graph showing a reference curve for a high contrast image.

In FIGS. 4 to 7, X axes represent values obtained by normalizing the range of 0 to 255 to the range of 0 to 1, and Y axes represent the luminance values of 0 to 255.

Referring to FIG. 7, when comparing with a dashed line representing linear distribution, the high contrast image does not require contrast enhancement at all, or is rarely changed through the contrast enhancement.

Figure 8:
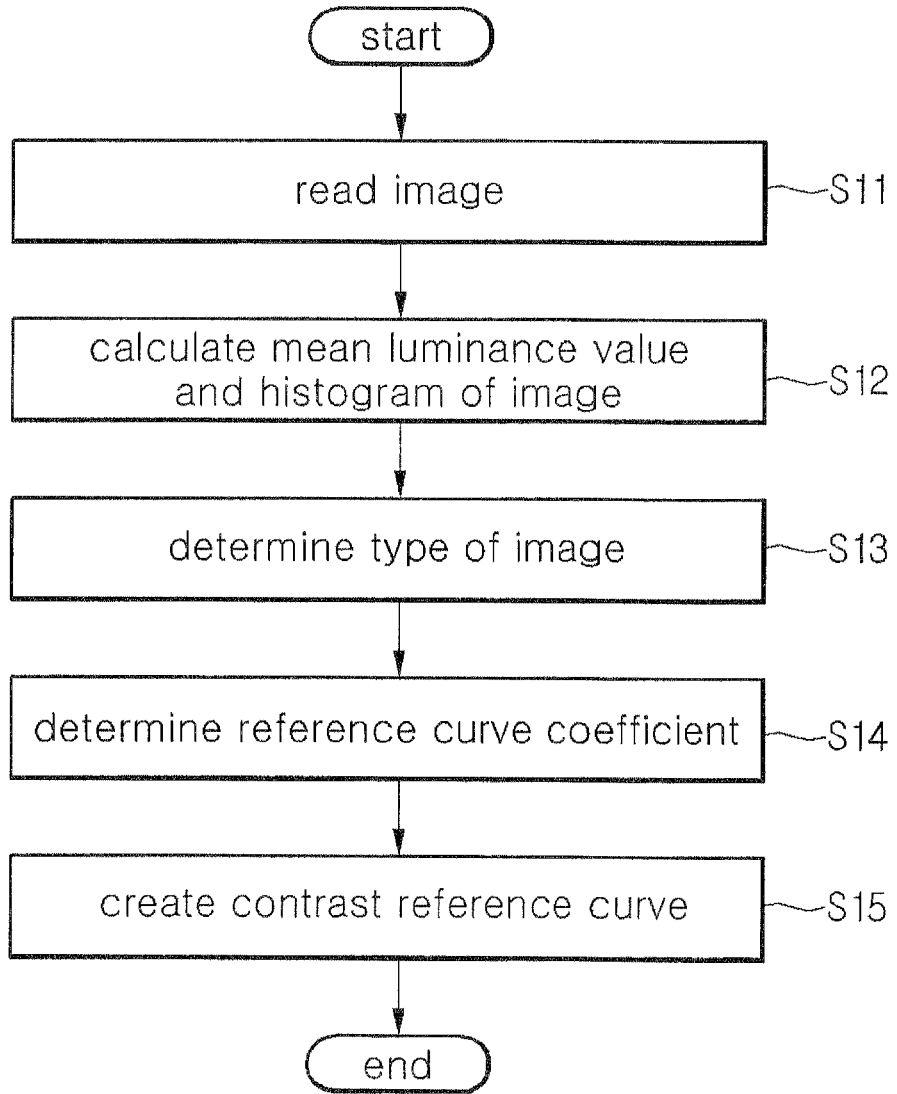
FIG. 8 is a flowchart showing a method of creating a reference curve according to one embodiment of the present invention.

FIG. 8 is a flowchart showing the method of creating reference curves according to one embodiment of the present invention.

In step S11, an image is read. The image may have been photographed by a digital camera, or may have read out of a storage medium.

In step S12, the mean luminance value and the luminance histogram for the image are calculated.

In step S13, the type of the image is determined based on the mean luminous value and the luminous histogram. The type of the image may he one of a low lighting image, a back lighting image, a regular lighting image, and a high contrast image.

In step S14, contrast reference curve coefficients are calculated according to image types. The coefficients may be optimized values based on experimental values according the image types.

In step S15, the determined coefficients are applied to a hyperbolic tangential function curve to create contrast reference curves. The contrast reference curves created according to the image types are shown in FIGS. 4 to 7.

Figure 9:
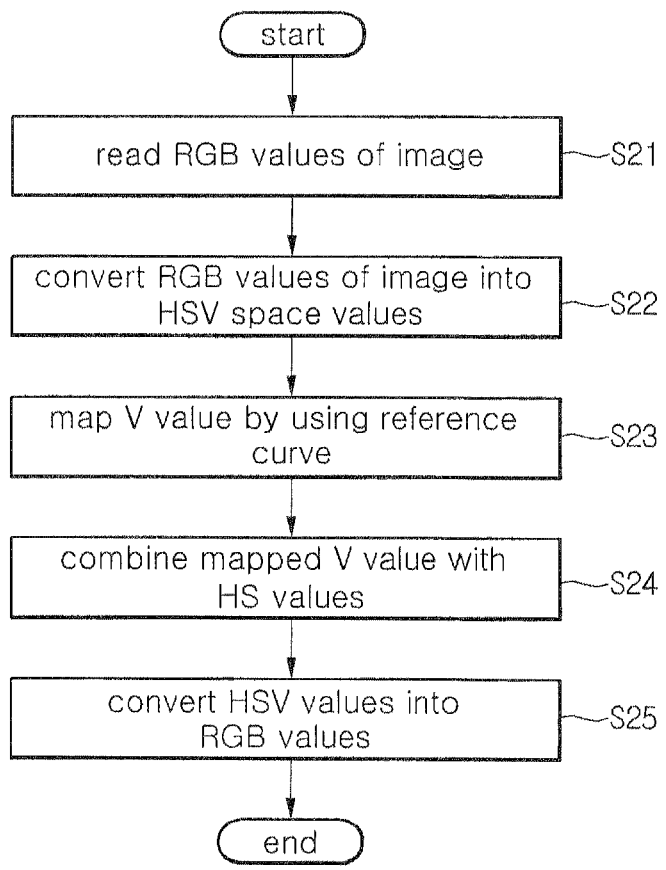
FIG. 9 is a flowchart showing a method of performing contrast enhancement according to one embodiment of the present invention.

The contrast enhancement can be performed by using the reference curves created through the steps. FIG. 9 is a flowchart showing the method of performing contrast enhancement according to one embodiment of the present invention.

RGB values of the image are read in step S21. Since the RGB values contain color difference components, the RGB values are converted into HSV space values in order to separate a luminance component in step S22.

In step S23, the V value of the HSV values is mapped with a new V value by using the contrast reference curves according to the image types.

The new V value is combined with HS values in step S24, and the HSV values are converted into ROB values in step S25.

If contrast-enhanced values are significantly different from target values, the above processes may be repeatedly performed.

According to another embodiment, YCbCr values may be used instead of the HSV values and the above processes may be performed with respect to the YCbCr values. In other words, the RGB values of the read image are converted into the YCbCr values, a Y value of the YCbCr values is mapped with a new Y value by using the reference curve, the new Y value is combined with the YCbCr values, and the VCbCr values may be converted into the RGB values.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing adaptive contrast enhancement according to image types, the method comprising:
    reading an image;
    calculating a mean luminance value and luminance histogram of the image;
    determining a type of the image based on the mean luminance value and the luminance histogram;
    creating contrast reference curves by applying different coefficients according to image types to a hyperbolic tangential function curve; and
    performing contrast enhancement of the image by using the contrast reference curves;
    wherein the type of the image is determined as a low lighting image in a case of 0<the mean luminance value≤50, a regular lighting image in a case of 50<the mean luminance value≤200, a back lighting image in a case of 200<the mean luminance value≤255, and a high contrast image in a case in which a maximum number of pixel counts is represented at both high and low luminance values in luminance histogram distribution.

2. The method of claim 1, wherein the creating of the contrast reference curves includes:
    calculating "a normalized pixel value=a pixel value/255"; and
    calculating
    x=((the normalized pixel value^a cutoff factor−0.5)*an amplitude factor), in which the pixel value has a range of 0 to 255, and the cutoff factor and the amplitude factor are coefficients variously given according to image types.

3. The method of claim 2, wherein, in the coefficients variously given according to image types, the cutoff factor is 0.35 and the amplitude factor is 0.74 if the image is the low lighting image,
    wherein the cutoff factor is 0.35 and the amplitude factor is 6 if the image is the back lighting image,
    wherein the cutoff factor is 1 and the amplitude factor is 1.94 if the image is the regular lighting image, and
    wherein the cutoff factor is 1, and the amplitude factor is 0.0002 if the image is the high contrast image.

4. A method of performing adaptive contrast enhancement according to image types, the method comprising:
    reading an image;
    calculating a mean luminance value and luminance histogram of the image;
    determining a type of the image based on the mean luminance value and the luminance histogram;
    creating contrast reference curves by applying different coefficients according to image types to a hyperbolic tangential function curve; and
    performing contrast enhancement of the image by using the contrast reference curves,
    wherein the performing of contrast enhancement includes:
    reading RGB values of the image;
    converting the RGB values into HSV space values;
    mapping a V value of the HSV space values by using the contrast reference curves;
    combining a mapped V value with HS values; and
    converting the combined HSV values into RGB values.

* * * * *